US008270633B2

(12) United States Patent
Isaka

(10) Patent No.: US 8,270,633 B2
(45) Date of Patent: Sep. 18, 2012

(54) NOISE SUPPRESSING APPARATUS

(75) Inventor: Takehiko Isaka, Hachiouji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1254 days.

(21) Appl. No.: 11/605,570

(22) Filed: Nov. 29, 2006

(65) Prior Publication Data

US 2008/0075300 A1 Mar. 27, 2008

(30) Foreign Application Priority Data

Sep. 7, 2006 (JP) ............................... P2006-243407

(51) Int. Cl.
*H04B 15/00* (2006.01)

(52) U.S. Cl. ..................... 381/94.2; 381/94.1; 381/94.3; 704/226

(58) Field of Classification Search ........ 381/94.1–94.8, 381/57, 104, 71.1–71.14; 704/225–226, 704/233
See application file for complete search history.

(56) References Cited

U.S. PATENT DOCUMENTS

| | | | | |
|---|---|---|---|---|
| 6,104,993 | A * | 8/2000 | Ashley | 704/227 |
| 7,054,808 | B2 | 5/2006 | Yoshida | |
| 7,096,182 | B2 * | 8/2006 | Chandran et al. | 704/226 |
| 7,302,065 | B2 * | 11/2007 | Furuta | 381/94.3 |
| 7,454,332 | B2 * | 11/2008 | Koishida et al. | 704/227 |
| 7,590,528 | B2 | 9/2009 | Kato et al. | |

FOREIGN PATENT DOCUMENTS

| | | | |
|---|---|---|---|
| JP | 2002-073066 | A | 3/2002 |
| JP | 2002-204175 | A | 7/2002 |
| JP | P 3454206 | B2 | 7/2003 |

OTHER PUBLICATIONS

Y. Ephraim et al, "Speech Enhancement Using a Minimum Mean-Square Error Short-Time Spectral Amplitude Estimator", IEEE Transactions on Acoustics, Speech, and Signal Processing, vol. ASSP-32, No. 6, Dec. 1984, pp. 1109-1121.

Japanese Office Action dated May 17, 2011 (and English translation thereof) in counterpart Japanese Application No. 2006-243407.

* cited by examiner

*Primary Examiner* — Vivian Chin
*Assistant Examiner* — Fatimat O Olaniran
(74) *Attorney, Agent, or Firm* — Holtz, Holtz, Goodman & Chick, PC

(57) ABSTRACT

According to an aspect of the invention, there is provided a noise suppressing apparatus comprising: a fifth unit configured to calculate a gain for noise suppression, based on the first signal-to-noise ratio for each frequency band and the second signal-to-noise ratio for an entire frequency band; an eighth unit configured to calculate an upper limit value of a noise suppression amount for each frequency band, based on the second signal-to-noise ratio; a ninth unit configured to calculate the noise suppression amount for each frequency band, based on the first signal-to-noise ratio; and a tenth unit configured to limit, based on the upper limit value, the noise suppression amount so as to calculate the gain.

5 Claims, 6 Drawing Sheets

NOISE SUPPRESSING APPARATUS

CROSS-REFERENCE TO RELATED APPLICATIONS

This application is based on and claims the benefit of priority from the prior Japanese Patent Application No. 2006-243407, filed on Sep. 7, 2006; the entire contents of which are incorporated herein by reference.

BACKGROUND

1. Technical Field

The present invention is related to a noise suppressing apparatus for suppressing noise other than a target signal.

2. Description of Related Art

A noise suppressing apparatus capable of suppressing noise other than a target signal has been proposed (refer to Japanese Patent No. 3454206 (pages 8 to 12, FIG. 3)). In this noise suppressing apparatus, the higher the frequency band becomes, the higher a sensitivity of an SNR (signal-to-noise ratio) is increased, so that excessive noise suppression of the higher frequency band can be prevented.

SUMMARY

According to an aspect of the invention, there is provided a noise suppressing apparatus comprising: a first unit configured to convert a temporal waveform of a predetermined temporal width into frequency components each composed of an amplitude and a phase; a second unit configured to calculate a band power for each frequency band, based on the amplitude component; a third unit configured to estimate a noise power for each frequency band, based on the band power; a fourth unit configured to calculate a first signal-to-noise ratio for each frequency band and a second signal-to-noise ratio for an entire frequency band, based on the noise power and the band power; a fifth unit configured to calculate gains for noise suppression, based on the first signal-to-noise ratios and the second signal-to-noise ratio; a sixth unit configured to weight the amplitude components, based upon the gains; and a seventh unit configured to produce the temporal waveform from the phase components and the weighted amplitude components, wherein the fifth unit further comprises; an eighth unit configured to calculate an upper limit value of a noise suppression amount for each frequency band, based on the second signal-to-noise ratio; a ninth unit configured to calculate the noise suppression amount for each frequency band, based on the first signal-to-noise ratios; and a tenth unit configured to limit, based on the upper limit value, the noise suppression amount so as to calculate the gains.

According to another aspect of the invention, there is provided a noise suppressing apparatus comprising: a first unit configured to convert a temporal waveform of a predetermined temporal width into frequency components each composed of an amplitude and a phase; a second unit configured to calculate a band power for each frequency band, based on the amplitude component; a third unit configured to estimate a noise power for each frequency band, based on the band power; a fourth unit configured to calculate a signal-to-noise ratio for each frequency band, based on the noise power and the band power; a fifth unit configured to calculate gains for noise suppression, based on the signal-to-noise ratios; a sixth unit configured to weight the amplitude components, based upon the gains; and a seventh unit configured to produce the temporal waveform from the phase components and the weighted amplitude components, wherein the fifth unit further comprises; a ninth configured to calculate a noise suppression amount for each frequency band, based on the signal-to-noise ratios; an eleventh unit configured to calculate, based on at least one of the signal-to-noise ratios and the gain which is previously calculated, a correction amount of the noise suppression amount for each frequency band in order to suppress noise; and a twelfth unit configured to correct, based on the correction amount, the noise suppression amount so as to calculate the gain.

DESCRIPTION OF THE EMBODIMENTS

Figure 1:
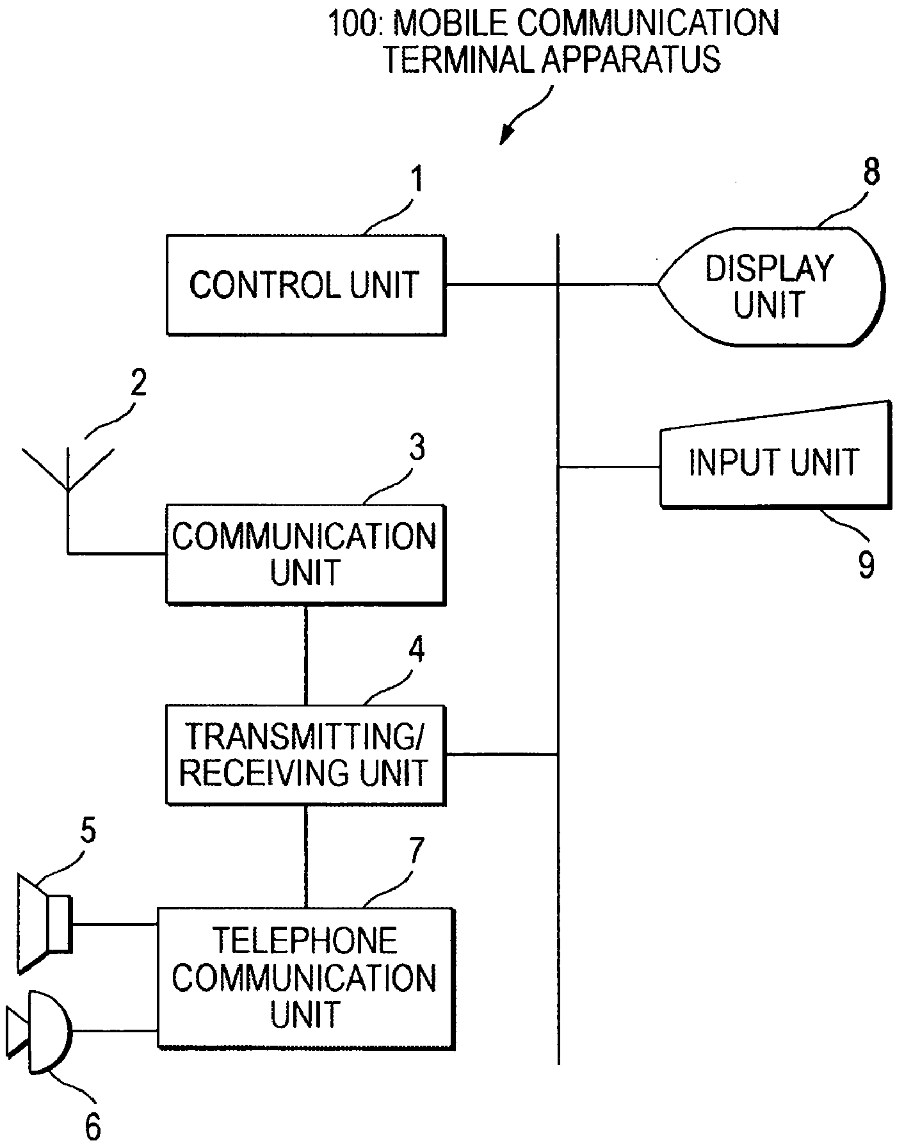
FIG. 1 is an exemplary block diagram showing an arrangement of a mobile communication terminal apparatus according to embodiments of the present invention.

FIG. 1 is a block diagram for indicating an arrangement of a mobile communication terminal apparatus 100 according to embodiments. The mobile communication terminal apparatus 100 is arranged by a control unit 1, an antenna 2, a communication unit 3, a transmitting/receiving unit 4, a speaker 5, a microphone 6, a telephone communication unit 7, a display unit 8, an input unit 9, and the like.

Figure 2:
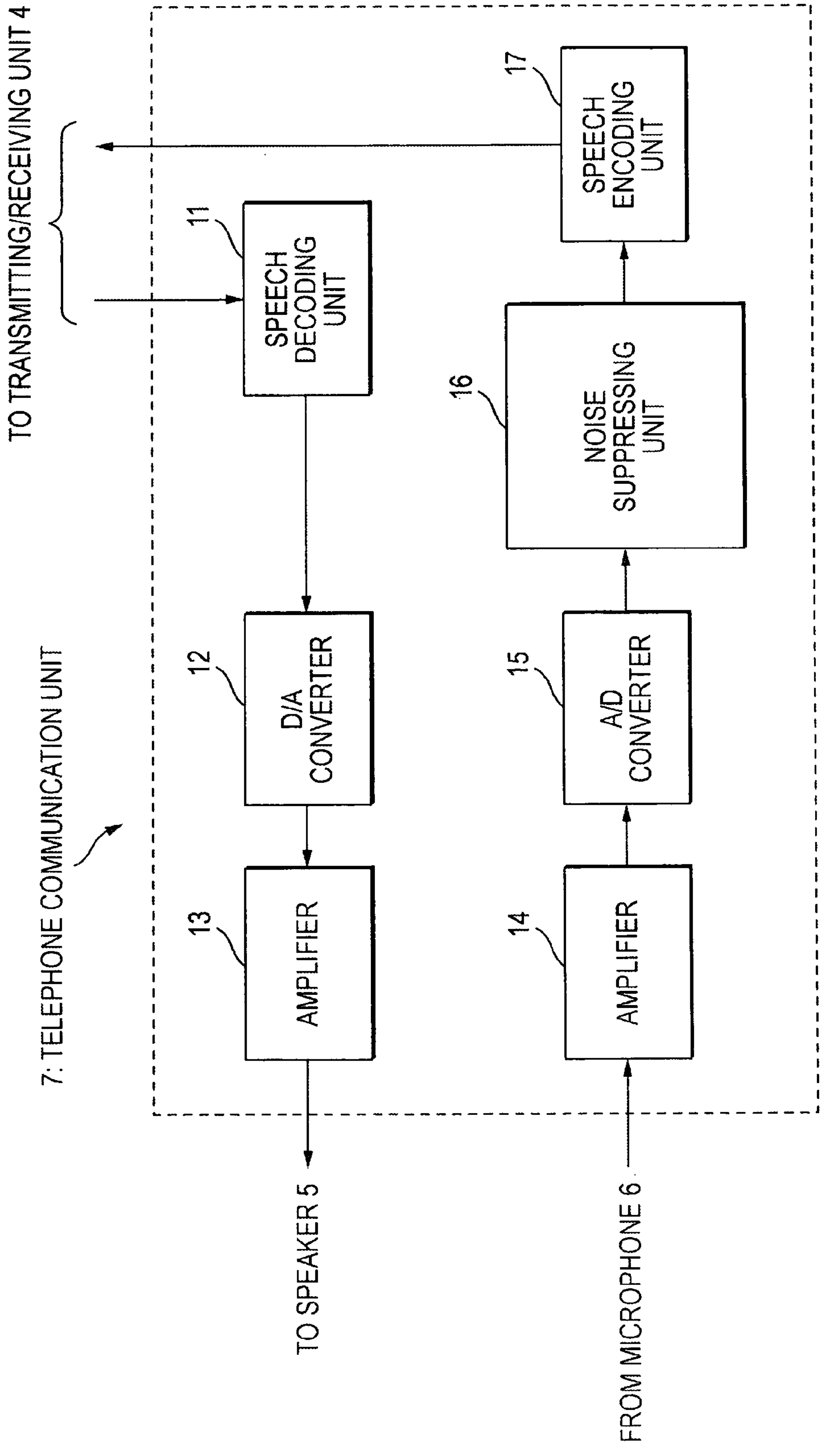
FIG. 2 is an exemplary block diagram representing a detailed arrangement of a telephone communication unit according to the embodiments.

The control unit 1 controls a whole system of the mobile communication terminal apparatus 100. The antenna 2 is used so as to transmit and receive electromagnetic waves with respect to a base station (not shown). The communication unit 3 performs modulating/demodulating process operations and the like. The transmitting/receiving unit 4 performs transmitting/receiving process operations as to image data and speech data, and other process operations. The speaker 5 and the microphone 6 correspond to a speech input/output interface between a user of the mobile communication terminal apparatus 100, and these speaker 5, and microphone 6. The telephone communication unit 7 performs a speech process operation. A noise suppressing unit (noise suppressing apparatus) is provided in this telephone communication unit 7. The display unit 8 and the input unit 9 correspond to an interface as to a display and a key input between the user, and these units 8 and 9. The detailed content of the telephone communication unit 7 among these units will be explained as follows:

FIG. 2 is a block diagram for showing a detailed arrangement of the telephone communication unit 7 according to the embodiments. The telephone communication unit 7 is arranged by a speech decoding unit 11, a D/A converter 12, an amplifier 13, another amplifier 14, an A/D converter 15, a noise suppressing unit 16 (noise suppressing apparatus), a speech encoding unit 17, and the like.

The speech decoding unit 11 performs a decoding process operation as to a compressed speech signal from the transmitting/receiving unit 4. The D/A converter 12 D/A-converts the decoded speech signal. The amplifier 13 amplifies the D/A-converted speech signal so as to supply the amplified speech signal to the speaker 5.

The amplifier 14 amplifies a speech signal derived from the microphone 6. The A/D converter 15 A/D-converts the amplified speech signal. The noise suppressing unit 16 performs a noise suppressing process operation with respect to the A/D-converted signal. The speech encoding unit 17 performs a speech compression process operation with respect to the noise-suppressed speech signal, and then, sends out the speech-processed signal to the transmitting/receiving unit 4. A detailed content of the noise suppressing unit 16 among these units will be explained in the below-mentioned embodiment 1 and embodiment 2.

[First Embodiment]

Figure 3:
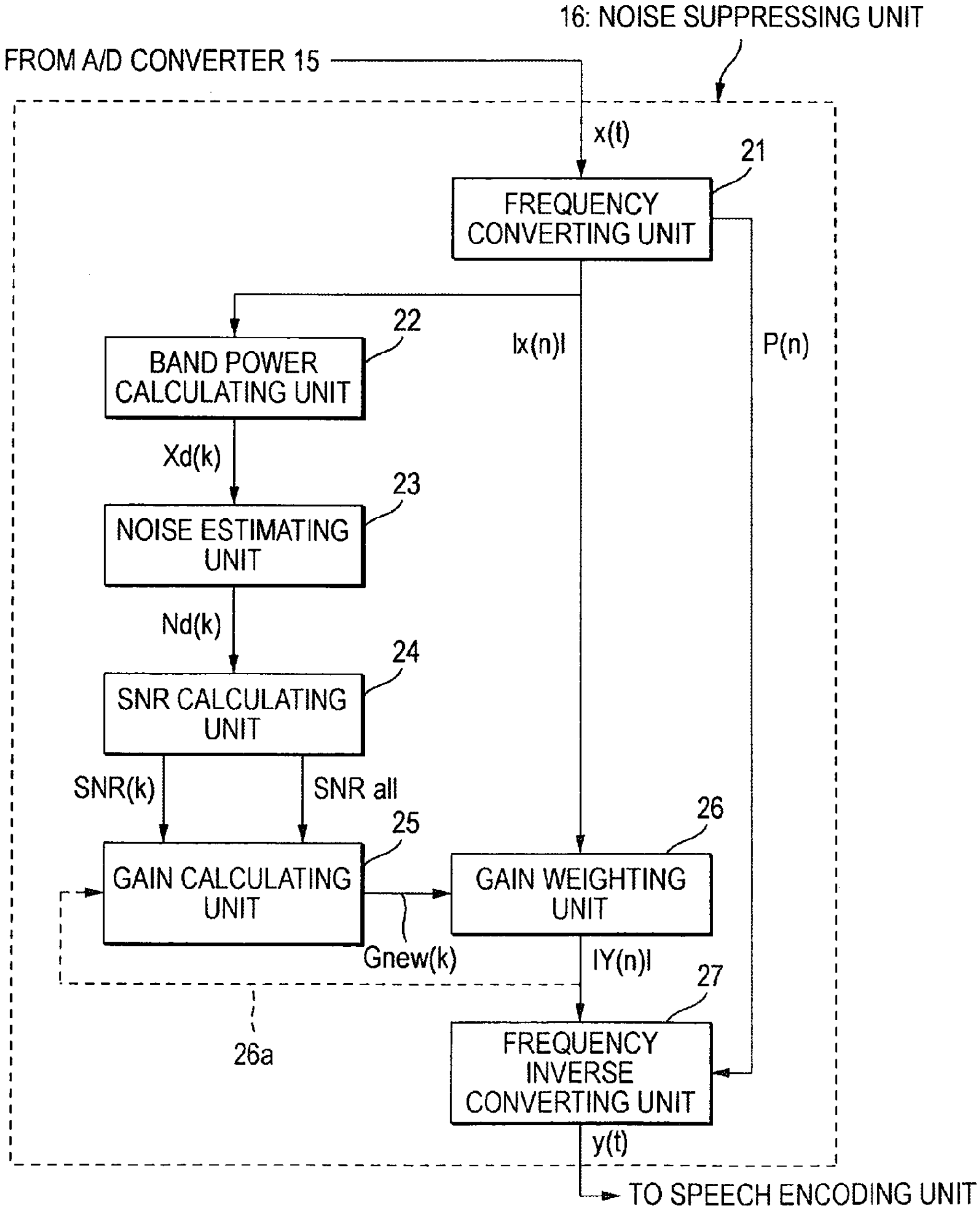
FIG. 3 is an exemplary block diagram showing a detailed arrangement of a noise suppressing unit according to a first embodiment of the invention.

FIG. 3 is a block diagram for showing a detailed arrangement of a noise suppressing unit 16. The noise suppressing unit 16 is arranged by a frequency converting unit 21, a band power calculating unit 22, a noise estimating unit 23, an SNR calculating unit 24, a gain calculating unit 25, again weighting unit 26, a frequency inverse converting unit 27, and the like. Among these units, the gain calculating unit 25 is further equipped with the below-mentioned arrangement.

Figure 4:
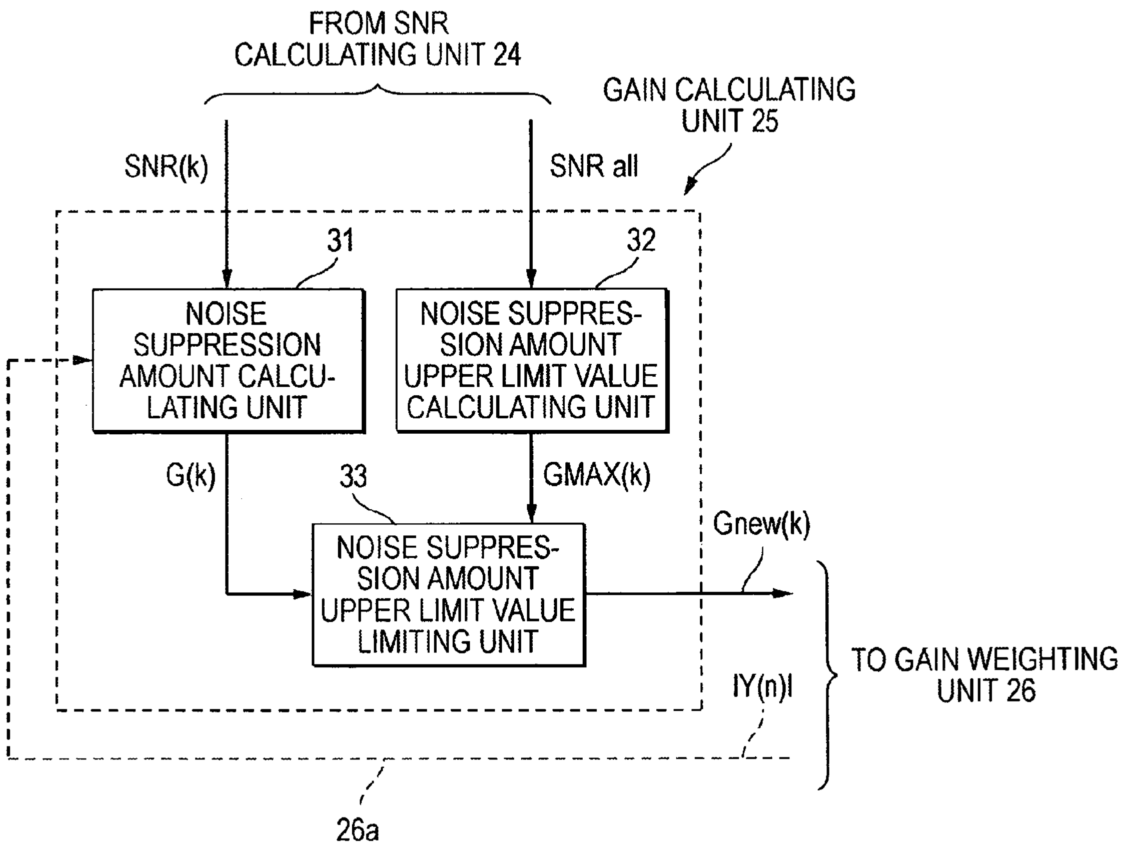
FIG. 4 is an exemplary block diagram for indicating a detailed arrangement of a gain calculating unit according to the first embodiment.

FIG. 4 is a block diagram for showing a detailed arrangement of the gain calculating unit 25. The gain calculating unit 25 is arranged by a noise suppression amount calculating unit 31, a noise suppression amount upper limit value calculating unit 32, a noise suppression amount upper limit value limiting unit 33, and the like.

Referring now to FIG. 3 and FIG. 4, a description is made of operations of the respective portions of the noise suppressing unit 16. Firstly, the frequency converting unit 21 divides speech signals "x(t)" into frames of a predetermined time length, for instance, 128, and then, performs a time/frequency domain converting process operation for every frame. As a result, both amplitude spectrums $|X(n,j)|$ ($n=0$ to $N-1$. symbol "N" indicates frame length), and phase spectrums P (n, j) are obtained. For the sake of simple descriptions, while both the absolute value symbol "|" and the frame number "j" are basically omitted, the amplitude spectrum is referred to as "X(n)." However, in the case that frame numbers must be discriminated from each other in the explanation as to formulae, these frame numbers are described.

Prior to the time/frequency domain converting process operation, the frequency converting unit 21 may alternatively provide a pre-emphasis process operation with respect to the entered digital speech signal x(t) in order to flatten a spectrum envelope, and may alternatively provide a high-pass filter in order to cut off a DC component of the entered digital speech signal.

Alternatively, a frame length and a shift width of the time/frequency domain converting process operation may not be made equal to each other. For instance, in the case that the frame length is selected to be 128 and the shift width is selected to be 80, the input digital speech signal x(t) corresponding to 80 samples may be stored in a frame front half portion, and the remaining 48 samples may be set to 0, and thereafter, a window process having a sine wave characteristic may be performed in order to eliminate a discontinuity at a boundary. Amore concrete method as to the pre-emphasis and window process operations is described in the specification of the coding system standardized in US TIA, namely described in TIA/EIA IS-127 EVRC 1997-01 in detail.

The amplitude spectrum X(n) obtained by the time/frequency domain converting process operation in the above-explained manner is outputted to both the band power calculating unit 22 and the gain weighting unit 26. Also, the phase spectrum P(n) is outputted to the frequency inverse converting unit 27.

The band power calculating unit 22 divides the amplitude spectrum X(n) into a plurality of frequency band (for example, 16 pieces of frequency bands) from a low frequency range to a high frequency range, and averages the amplitude spectrum X(n) with respect to each of these divided frequency bands so as to calculate band power "Xd(k)" as representative band power in the respective frequency bands. It should also be understood that $k=0$ to $K-1$. Symbol "K" indicates a total number of frequency bands, for instance, 16. It is so assumed that when "k" is small, the frequency band is the low frequency band, whereas when "k" is large, the frequency band is the high frequency band. The first embodiment has exemplified such an example that the amplitude spectrum X(n) is divided at the equal-intervals. Alternatively, the frequency band dividing widths may be narrowed in the lower frequency band as realized in a Mel-scale and Bark-scale. Namely, a frequency band divided width suitable for a human auditive characteristic may be employed. Furthermore, in the above-described embodiment 1, in order to obtain stable power rather than employment of power of an amplitude spectrum having an instantaneous large variation, the amplitude spectrum X(n) has been divided into the frequency bands. Instead thereof, the amplitude spectrum X(n) may be more precisely processed by employing power itself of an amplitude spectrum in a specific band (for example, either low frequency band or all frequency bands). The band power "Xd(k)" which constitutes the representative band power for the respective frequency bands is outputted to the noise estimating unit 23.

The noise estimating unit 23 estimates noise band power "Nd(k)" for each of the frequency bands by employing the band power "Xd(k)" which is the calculated power representative of the respective frequency bands. The noise estimating unit 23 judges as to whether or not voice is present in a relevant section, or judges as to how degree noise may be present by considering an intermediate condition of both sections, and then, predicts noise band power Nd(k) in response to the judgement result.

The noise estimating unit 23 may directly estimate power of a section as the noise band power Nd(k), which is judged as noise. Alternatively, the noise estimating unit 23 may employ averaged power of "M" pieces of past frames including the present frame, which are judged as noise sections, as the noise band power Nd(k). Also, when power of a certain section is judged as noise, the noise estimating unit 23 may alternatively employ a summation between this judged noise and past predicted noise by way of a cyclic filter as the noise band power Nd(k), or may alternatively perform a weighting operation by especially considering such a section which is judged as noise. As previously explained, the noise estimating unit 23 estimates an approximate value of a stationary noise components as the noise band power "Nd(k)", while can be hardly influenced by influences of voice and instantaneous variation of noise.

These judging process operation and estimating process operation may be alternatively carried out for each of the bands, or for one combined band made of the plural bands, or for a summation between the weighted one band and the weighted combined band. Thus, the noise band power Nd(k) calculated in the above-explained manner is outputted to the SNR calculating unit 24.

The SNR calculating unit 24 calculates a signal-to-noise ratio "SNR (k)" for each of the frequency bands by employing the band power "Xd(k)" and the noise band power "Nd(k)" so as to obtain SNR(k)=Xd(k)/Nd(k). Also, a signal-to-noise ratio "SNR_all" of the entire band is calculated as SNR_all=Z (k=0 to K−1)×d(k)/Σ (k=0 to K−1)Nd(k). Otherwise, like SNR_all=(1/K)×Σ (k=0 to K−1)SNR(k), the signal-to-noise ratio SNR_all of the entire band may be calculated as an averaged value of SNR(k) for each of the bands. Similarly, like SNR_all=(1/K)×max(k=0 to K−1)[SNR(k)], the signal-to-noise ratio SNR_all may be calculated as a maximum value of SNR(k) for each of the bands. In summary, SNR_all may be merely equal to such a parameter which indicates SNR of the entire band, but is not limited only to the above-explained SNR values. The signal-to-noise ratios of "SNR (k)" and "SNR_all" calculated in the above-described manner are outputted to the noise suppression amount calculating unit 31 and the noise suppression amount upper limit value calculating unit 32 of the gain calculating unit 25.

The noise suppression amount calculating unit 31 calculates a noise suppression amount "G(k)" by employing the signal-to-noise ratio SNR(k). As a concrete calculating method, for instance, one calculating method is described in S. F. Boll "Suppression of acoustic noise in speech using spectral subtraction" IEEE Transaction ASSP, Volume 27, No. 2, pages 113 to 120, February 1979 (page 114, item C of second section). Namely, a so-called "Spectral Subtraction: SS method" is disclosed.

Otherwise, another concrete calculating method is disclosed in Y. Ephraim et. al., "Speech enhancement using a minimum mean-square error short-time spectral amplitude estimator", ASSP, Volume 32, No. 6, pages 1109 to 1121, 1984 (page 1118, formula 53). Namely, a so-called "MMSE-STSA" method, the Wiener filtering method, and the like are typical methods. The Wiener filtering method is disclosed in J. S. Lim and A. V. Oppenheim, "Enhancement and Bandwidth Compression of Noisy Speech", Proceeding of the IEEE, volume 67, pages 1586 to 1604, December 1979. In the so-called "MMSE-STSA" method, since the amplitude spectrum |Y(n, j)| is also employed which has been suppressed before 1 frame, a signal line 26*a* indicated by a dot line is added.

These methods correspond to methods for suppressing noise components contained in input signals in such a manner that the larger the signal-to-noise ratio SNR(k) becomes, the closer the gain of the band "k" is approached to 1 (namely, suppression amount=0 dB), whereas the smaller the signal-to-noise ratio SNR(k) becomes, the closer the gain of the band "k" is approximated to either 0 or a positive lower limit value. In other words, as to such a bank resembled to noise, the gain thereof is decreased so as to suppress the noise. The method for calculating the noise suppression amount G(k) is not limited only to the above-explained calculation methods. The noise suppression amount G(k) calculated in the above-explained manner is outputted to the noise suppression amount upper limit value limiting unit 33.

The noise suppression amount upper limit value calculating unit 32 calculates an upper limit value "G_MAX (k)" of the noise suppression amount by employing the signal-to-noise ratio SNR_all of the entire range in accordance with the below-mentioned formula (1):

$$G\_MAX(k)=\log 10[pow(10, -(SNR\_all\times A-(B-k/N\times C)/20)/D) \qquad \text{(formula 1)}$$

In this formula (1), symbols A, B, C, D indicate predetermined constants, for example, A=1, B=60, C=80, D=10. Also, symbol "k" represents a frequency band, k=0 to K−1. Symbol "K" shows a total number of frequency bands, for example, 16. When the frequency band "k" is small, a low frequency band is indicated, whereas when the frequency band "k" is large, a high frequency band is indicated. Symbol "N" denotes a frame length. Symbol "X" indicates multiplication operation.

Symbol "SNR_all" represents a signal-to-noise ratio of an entire frequency band. Formula "(B−k/N×C)" indicates such a predetermined value that the higher the frequency band becomes, the smaller this predetermined value becomes.

Formula "(SNR_all×A−(B−k/N×C))" indicates a signal-to-noise ratio for each of the frequency bands.

Formula "pow[10, −(SNR_all×A−(B−k/N×C))/20]" indicates a power of [−SNR_all×A−(B−k/N×C)]/20] of 10.

Formula "log 10[pow[10, −(SNR_all×A−(B−k/N×C))/20/D]" shows a logarithm of "pow(10, −(SNR_all×A−(B−k/N×C)/20/D)" in which a base of this logarithm is 10.

In the formula (1), the higher the frequency band becomes, the larger the value "k/N×C" becomes; the higher the frequency band becomes, the smaller the predetermined value "(B−k/N×C)" becomes, the signal-to-noise ratio of (SNR_all×A−(B−k/N×C))" for each of the frequency bands becomes large; "pow[10, −(SNR_all×A−(B−k/N×C))/20]" becomes small. Also, the upper limit value "G_MAX(k)=log 10[pow(10, −(SNR_all×A−(B−k/N×C)/20)/D)" of the noise suppression amount becomes small. That is to say, when the frequency band is increased, there is such an effect that the upper limit value G_MAX(k) of the noise suppression amount is lowered, so that a hoarseness of voice in the high frequency band can be reduced.

Also, in the above-explained formula (1), when the signal-to-noise ratio for the entire frequency band of "SNR_all" is increased, there is such an effect that the upper limit value of the noise suppression amount is lowered, so that the hoarseness in the speech section can be reduced. As previously explained, if the SNR of the entire frequency band is larger, then the upper limit value of the noise suppression amount is lowered. As a result, even when an SNR(k) of a partial frequency band (especially, high frequency band) is small, it is possible that the excessive suppression of the partial band is reduced. Since the purpose of the noise suppression amount upper limit calculating unit 32 is to achieve such an effect, the realizing method thereof is not limited only to the above-explained formula (1). The upper limit value "G_MAX(k)" of the noise suppression amount calculated in the above-described method is outputted to the noise suppress ion amount upper limit value limiting unit 33.

The noise suppression amount upper limit value limiting unit 33 calculates again "G_new(k)" by employing the noise suppression amount "G(k)" and the upper limit value "G_MAX(k)" of the noise suppression amount in accordance with the below-mentioned formula (2):

$$G\_new(k)=pow[10, MAX(-G(k), -G\_MAX(k)) \qquad \text{(formula 2)}$$

Formula "MAX(−G(k), −G_MAX(k)" is equal to a larger value between −G(k) and −G_MAX(k). In other words, if −G(k)>−G_MAX(k), then −G(k) is returned, whereas if −G(k)≦−G_MAX(k), then −G_MAX(k) is returned.

The formula "pow[10, MAX(−G(k), −G_MAX(k))]" indicates the power of "MAX(−G(k), −G_MAX(k))" of 10.

As previously explained, the noise suppression amount G(k) is limited by the upper limit value G_MAX(k) As a result, such an effect may be achieved that the hoarseness of the voice caused by the excessive suppression can be reduced. Furthermore, in order to achieve a similar effect, the gain "G_new(k)" may be limited by a predetermined lower limit value "G_th (for example, 0.2)." The gain "G_new(k)" calculated in accordance with the above-explained manner is outputted to the gain weighting unit 26.

The gain weighting unit 26 multiplies the amplitude spectrum X (n) calculated by the frequency converting unit 21 by the gain G_new(k) so as to perform the weighting process operation, so that such an amplitude spectrum "Y(n)" whose noise has been suppressed is calculated. The amplitude spectrums "Y(n)" calculated in the above-described manner are outputted to the frequency inverse converting unit 27.

The frequency inverse converting unit 27 converts the amplitude spectrums "Y(n)" whose noise have been suppressed and the phase spectrums "P(n)" into speech signals "y(t)" of a time domain. In this case, when a value of a frame length is not equal to a value of a shift width, for instance, in such a case that the frame length is selected to be 128 and the shift width is selected to be 80, 48 samples of speech signals y(t) in a rear portion processed in the previous frame j−1, are added to 48 samples in a front portion processed in the present frame j, so that a discontinuity of a boundary between the preceding frame and the present frame may be eliminated. Also, in such a case that a pre-emphasis process operation is carried out in the preceding process operation of the frequency converting unit 21, a process operation such as a de-emphasis process operation may be carried out so as to return the speech signal to the original status. A more concrete method is described in detail in TIA/ETA IS-127 EVRC, 1997-01, which corresponds to the specification of the encoding system standardized in US TIA. This converted digital speech signal "y(t)" is outputted to the speech encoding unit 17 as a final output of the noise suppressing unit 16.

In the above-described explanation, the noise suppressing unit 16 is applied in order to suppress the noise of the transmitted voice of the mobile communication terminal apparatus 100, but is not limited only to this purpose. When the noise of the received voice has not been suppressed, the noise suppressing unit 16 may also be alternatively applied to the mobile communication terminal apparatus 100 so as to suppress the noise contained in the received speech signal by suppressing the noise contained in the received speech signal corresponding to the output signal from the speech decoding unit 11, and then, by outputting the noise-suppressed speech signal to the D/A converter 12. Alternatively, in the case that an apparatus of a telephone communication counter party is not provided with a function capable of suppressing noise, the noise suppressing unit 16 may be applied to the apparatus of the counter party in order to suppress noise of transmitted voice as well as to suppress noise of received voice.

In accordance with the first embodiment, there is such an effect that the higher the frequency b and becomes, the lower the upper limit value of the noise suppression amount is decreased. Also, the voice hoarseness in the high frequency band can be reduced.

[Second Embodiment]

In the above-described embodiment 1, the higher the frequency band becomes, the lower the upper limit value of the noise suppression amount is decreased in the SNR of the entire frequency band, so that the voice hoarseness in the high frequency band is reduced. However, in such a case that although the noise suppression amount G(k) is not reached to the upper limit value "G_MAX(k)", the value of SNR(k) is small, there are some possibilities that a hoarseness of sound may be produced while the noise suppression amount G(k) is not limited. As a consequence, in the second embodiment, even in such a case, a unit for preventing the hoarseness of the sound will be now explained. In the below-mentioned description, only different portions from those of the embodiment 1 will be mainly explained.

Figure 5:
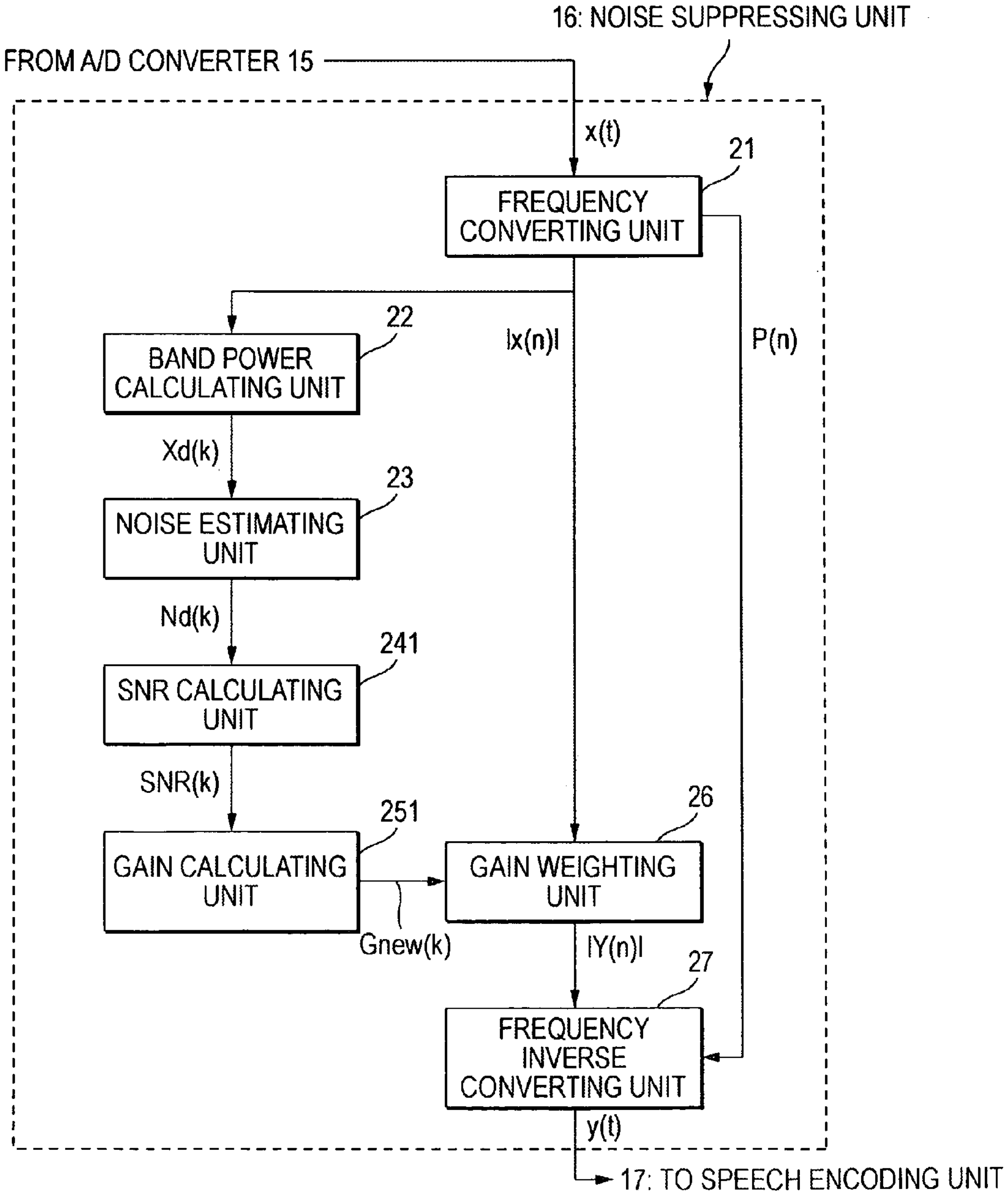
FIG. 5 is an exemplary block diagram for showing a detailed arrangement of a noise suppressing unit according to a second embodiment of the invention.

FIG. 5 is a block diagram for showing an arrangement of a noise suppressing unit according to the second embodiment. This noise suppressing unit is made by modifying the noise suppressing unit 16 shown in FIG. 3, namely corresponding to the embodiment 1, and may be used by replacing the noise suppressing unit 16 of FIG. 2. The different portion of this embodiment 2 from the embodiment 1 is an SNR calculating unit 241 and a gain calculating unit 251. Similar to the embodiment 1, in the SNR calculating unit 241, a signal-to-noise ratio SNR(k) for each of the frequency bands is calculated, and then, only the SNR(k) is outputted to the gain calculating unit 251. The gain calculating unit 251 is furthermore equipped with the below-mentioned arrangement.

Figure 6:
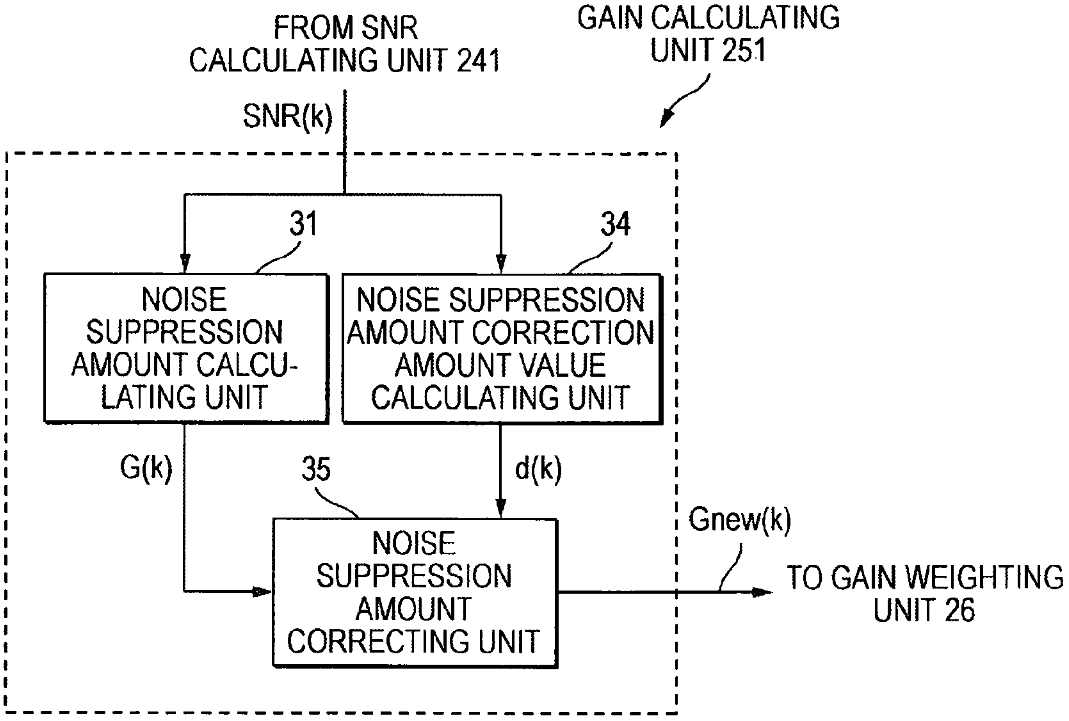
FIG. 6 is an exemplary block diagram for indicating a detailed arrangement of a gain calculating unit according to the second embodiment.

FIG. 6 is a block diagram for indicating a detailed arrangement of the gain calculating unit 251 according to the second embodiment. The gain calculating unit 251 is arranged by a noise suppression amount calculating unit 31, a noise suppression amount correction amount calculating unit 34, a noise suppression amount correcting unit 35, and the like.

Referring now to FIG. 6, a description is made of operations of the respective portions of the gain calculating unit 251. Firstly, in the noise suppression amount calculating unit 31, a noise suppression-amount-"G(k)" is calculated by employing the signal-to-noise ratio SNR(k). A concrete calculating method is similar to that of the embodiment 1. The noise suppression amount G(k) calculated in the above-described manner is outputted to the noise suppression amount correcting unit 35.

The noise suppression amount correcting amount calculating unit 34 calculates a correction amount "d (k)" of the noise suppression amount "G(k)" by employing the signal-to-noise ratio SNR(k). As a calculating method of the correction amount "d(k)", while either the signal-to-noise ratio SNR(k, j) or the gain G(k, j) is overviewed along a temporal direction (j−1), or a frequency direction (k−1, k, k+1), when there is a large value, if the correction amount of the suppression amount is also increased, then it is conceivable that a hoarseness can be reduced. As a concrete calculating method, the correction amount "d(k)" may be calculated in accordance with the below-mentioned formula (3):

That is, $$d(k)=E(k)+F(k)\times[G(k,j-1)-H(k)] \qquad \text{(formula 3)}$$

In this formula (3), symbol "G(k, j−1)" shows a gain obtained in the previous frame j−1. For instance, E(k)=1, F(k)=0.05, and H(k)=0.2. With respect to these values, the higher the frequency band becomes, the larger these values become, so that an influence given to the correction amount "d(k)" may be increased.

Alternatively, the correction value "d(k)" may be calculated in response to the maximum value of the signal-to-noise ratio SNR(k) for each of the frequency bands in accordance with the below-mentioned formula (4):

$$d(k)=E(k)+F(k)\times\max(i=0\text{ to }K-1)[SNR(i)] \qquad \text{(formula 4)}$$

In this case, such an example that the correction amount "d(k)" is considered up to 1 preceding frame along the temporal direction has been exemplified. Alternatively, the correction amount "d(k)" may be considered up to arbitrary number of preceding frames. Also, such an example that the correction amount "d(k)" is considered over the entire frequency band along the frequency direction has been exemplified. Alternatively, the correction amount "d(k)" may be considered up to arbitrary number of adjacent frequency bands. Thus, the correction amount "d(k)" calculated in the above-described manner is outputted to the noise suppression amount correcting unit 35.

The noise suppression amount correcting unit 35 calculates a gain "G_new(k)" by employing both the correction amount "d(k)" and the noise suppression amount "G(k)" in accordance with the below-mentioned formula (5):

$$G\_new(k)=G(k)\times\max[1, d(k)] \quad \text{(formula 5)}$$

In this formula (5), symbol "max [1, d(k)]" corresponds to a larger value between 1 and d(k). In other words, if 1<d(k), then the correction value "d(k)" is returned, whereas if 1≧d(k), then 1 is returned. Otherwise, only when 1<d(k), the gain G_new(k) is calculated as G_new(k)=G(k)×d(k). If 1≧d(k), then the gain may be calculated as G_new(k)=G(k), namely only substitution.

In accordance with the second embodiment, as previously, when the gain "G_new(k)" is calculated, even in such a case that although the noise suppression amount G(k) is not reached to the upper limit value "G_MAX(k)", the value of "SNR(k)" is small, the gain is corrected in such a manner that G_new(k) becomes large if either the large signal-to-noise ratio SNR(k,j) or the large gain G(k,j) is present along either the frequency direction or the temporal direction. As a result, the hoarseness of the sound can be reduced.

In the first and second embodiments, the noise suppressing unit has been applied to the mobile communication terminal apparatus. Apparently, the noise suppressing unit according to the embodiments may be alternatively applied to any types of speech signal handling apparatuses such as fixed type telephone apparatuses, conference systems, and speech recognizing apparatuses. The noise suppressing apparatus of the embodiments is not limited only to the above-explained arrangements, but may be modified in various manners.

According to the above embodiments, while the suppression performance in the noise section is maintained, the excessive suppression in the high frequency band in the speech section can be reduced.

What is claimed is:

1. A noise suppressing apparatus comprising:

a first unit configured to convert a temporal waveform of a predetermined temporal width into frequency components each composed of an amplitude and a phase;

a second unit configured to calculate a band power for each frequency band, based on the amplitude components;

a third unit configured to predict a noise power for each frequency band, based on the band powers;

a fourth unit configured to calculate a first signal-to-noise ratio for each frequency band and a second signal-to-noise ratio for an entire frequency band, based on the noise powers and the band powers;

a fifth unit configured to calculate gains for noise suppression, based on the first signal-to-noise ratios and the second signal-to-noise ratio;

a sixth unit configured to weight the amplitude components, based upon the gains; and a seventh unit configured to produce the temporal waveform from the phase components and the weighted amplitude components, wherein the fifth unit comprises:

an eighth unit configured to calculate an upper limit value of a noise suppression amount for each frequency band, based on the second signal-to-noise ratio;

a ninth unit configured to calculate the noise suppression amount for each frequency band, based on the first signal-to-noise ratios; and a tenth unit configured to limit the noise suppression amount for each frequency band to the corresponding upper limit value, so as to calculate the gains, and configured not to adjust the noise suppression amount when the noise suppression amount is below the corresponding upper limit value;

wherein the eighth unit calculates the upper limit values of the noise suppression amounts, based on the second signal-to-noise ratio, so that the higher the frequency band is, the lower the upper limit value of the noise suppression amount is.

2. A noise suppressing apparatus comprising:

a first unit configured to convert a temporal waveform of a predetermined temporal width into frequency components each composed of an amplitude and a phase;

a second unit configured to calculate a band power for each frequency band, based on the amplitude components;

a third unit configured to calculate a noise power for each frequency band, based on the band powers;

a fourth unit configured to calculate a first signal-to-noise ratio for each frequency band and a second signal-to-noise ratio for an entire frequency band, based on the noise powers and the band powers;

a fifth unit configured to calculate gains for noise suppression, based on the first signal-to-noise ratios and the second signal-to-noise ratio;

a sixth unit configured to weight the amplitude components, based upon the gains; and a seventh unit configured to produce the temporal waveform from the phase components and the weighted amplitude components, wherein the fifth unit comprises:

an eighth unit configured to calculate an upper limit value of a noise suppression amount for each frequency band, based on the second signal-to-noise ratio;

a ninth unit configured to calculate the noise suppression amount for each frequency band, based on the first signal-to-noise ratios; and a tenth unit configured to limit the noise suppression amount for each frequency band to the corresponding upper limit value, so as to calculate the gains, and configured not to adjust the noise suppression amount when the noise suppression amount is below the corresponding upper limit value.

3. The noise suppressing apparatus according to claim 2, wherein the eighth unit calculates the upper limit values of the noise suppression amounts, based on the second signal-to-noise ratio, so that the higher the frequency band is, the lower the upper limit value of the noise suppression amount is.

4. A noise suppressing apparatus comprising:

a first unit configured to convert a temporal waveform of a predetermined temporal width into frequency components each composed of an amplitude and a phase;

a second unit configured to calculate a band power for each frequency band, based on the amplitude components;

a third unit configured to estimate a noise power for each frequency band, based on the band powers;

a fourth unit configured to calculate a first signal-to-noise ratio for each frequency band and a second signal-to-noise ratio for an entire frequency band, based on the noise powers and the band powers;

a fifth unit configured to calculate gains for noise suppression, based on the first signal-to-noise ratios and the second signal-to-noise ratio;

a sixth unit configured to weight the amplitude components, based upon the gains; and a seventh unit configured to produce the temporal waveform from the phase components and the weighted amplitude components, wherein the fifth unit comprises:

an eighth unit configured to calculate an upper limit value of a noise suppression amount for each frequency band, based on the second signal-to-noise ratio;

a ninth unit configured to calculate the noise suppression amount for each frequency band, based on the first signal-to-noise ratios; and a tenth unit configured to limit the noise suppression amount for each frequency band to the corresponding upper limit value, so as to calculate the gains, and configured not to adjust the noise suppression amount when the noise suppression amount is below the corresponding upper limit value.

5. The noise suppressing apparatus according to claim 4, wherein the eighth unit calculates the upper limit values of the noise suppression amounts, based on the second signal-to-noise ratio, so that the higher the frequency band is, the lower the upper limit value of the noise suppression amount is.

* * * * *